(12) United States Patent
Heuman (10) Patent No.: US 11,138,821 B2
(45) Date of Patent: Oct. 5, 2021

(54) SYSTEM AND METHOD FOR HYBRID MODEL ELECTRONIC VOTING

(71) Applicant: Matthew Heuman, Kitchener (CA)

(72) Inventor: Matthew Heuman, Kitchener (CA)

( * ) Notice: Subject to any disclaimer, the term of this patent is extended or adjusted under 35 U.S.C. 154(b) by 0 days.

(21) Appl. No.: 16/594,698

(22) Filed: Oct. 7, 2019

(65) Prior Publication Data
US 2020/0226866 A1 Jul. 16, 2020

(51) Int. Cl.
G07C 13/00 (2006.01)
G06K 9/00 (2006.01)
H04L 29/08 (2006.01)

(52) U.S. Cl.
CPC ......... *G07C 13/00* (2013.01); *G06K 9/00288* (2013.01); *G06K 9/00449* (2013.01); *H04L 67/06* (2013.01)

(58) Field of Classification Search
CPC ........... G06K 9/00288; G06K 9/00449; G07C 13/00; H04L 67/06
See application file for complete search history.

(56) References Cited

U.S. PATENT DOCUMENTS

| | | | |
|---|---|---|---|
| 7,237,717 | B1 | 7/2007 | Rao et al. |
| 7,635,088 | B2 | 12/2009 | Chung et al. |
| 9,824,520 | B2 | 11/2017 | Correa Parker |
| 10,262,126 | B2 | 4/2019 | Tussy |
| 2002/0084325 | A1 | 7/2002 | Reardon |
| 2004/0024635 | A1* | 2/2004 | McClure ................ G07C 13/00 705/12 |
| 2005/0035199 | A1* | 2/2005 | Goci ....................... G07C 13/00 235/386 |
| 2005/0161507 | A1 | 7/2005 | Openshaw, II et al. |
| 2010/0153190 | A1* | 6/2010 | Matos .................... G07C 13/00 705/12 |
| 2011/0089236 | A1* | 4/2011 | Chung ................... B42D 25/27 235/386 |

(Continued)

FOREIGN PATENT DOCUMENTS

CA 2974409 A1 7/2016

OTHER PUBLICATIONS

Neural voting machines Richards, Whitman; Sebastian Seung, H.; Pickard, Galen. Neural Networks19.8: 1161-1167. Elsevier Ltd. (Oct. 2006) (Year: 2006).*

*Primary Examiner* — Thien M Le
(74) *Attorney, Agent, or Firm* — Bereskin & Parr LLP (57) ABSTRACT

Hybrid model electronic voting system and method for enabling individual voters to remotely cast a ballot electronically via inputs to a receiver where a user controls a mechanical system that produces a physical, readable ballot. The voting system comprises a voter interface device communicatively coupled to a data network, the voter interface device including a screen, the voter interface device configured to generate an input command containing a ballot selection; a portal server including a database containing an eligibility list, the portal server communicatively coupled to the data network and configured to connect to the voter interface device over the data network to validate an eligibility of a voter operating the voter interface device by comparing the voter to the eligibility list; a voting machine including a physical marking device and a camera, the voting machine communicatively coupled to the data network.

20 Claims, 1 Drawing Sheet

(56) References Cited

U.S. PATENT DOCUMENTS

| | | | |
|---|---|---|---|
| 2013/0301873 A1* | 11/2013 | Hoover | G06T 11/60 |
| | | | 382/103 |
| 2015/0012339 A1* | 1/2015 | Onischuk | G07C 13/00 |
| | | | 705/12 |
| 2015/0012399 A1* | 1/2015 | Ceribelli | G06Q 30/04 |
| | | | 705/34 |
| 2015/0039403 A1 | 2/2015 | Grossberg et al. | |
| 2015/0221153 A1 | 8/2015 | Dashiff et al. | |
| 2018/0114391 A1* | 4/2018 | Seibel | G06K 19/06037 |
| 2018/0211467 A1* | 7/2018 | Babic | G07C 13/02 |

* cited by examiner

SYSTEM AND METHOD FOR HYBRID MODEL ELECTRONIC VOTING

CROSS REFERENCE TO RELATED PATENT APPLICATIONS

The application claims the benefit of U.S. Provisional Application No. 62/764,512, filed on Aug. 8, 2018. The complete disclosure of U.S. Provisional Application No. 62/764,512 is hereby incorporated herein by reference.

TECHNICAL FIELD

The present disclosure generally relates to electronic voting and, more particularly, to electronic voting in an election via a public data network such as the internet to remotely control a device that produces a physical ballot.

BACKGROUND

An election is to be construed as involving a voter electing a public, private or governmental agent, party or body, and/or the casting of a vote in a poll or referendum, and/or any other type of election wherein persons may choose between two or more alternatives or options and communicate their choice as a vote or by means of a vote collecting authority.

An important aspect of said election is that participation in an election, poll or referendum is restricted to eligible persons based on but not limited to registration, membership or criteria outlined by the respective governing body of said election to authenticate valid participants.

At present, an election for a public body, for example, may require that a person has to register prior to or at a polling station to fill out a ballot form or vote electronically by pushing buttons on a voting machine. For expats living abroad, votes may be forwarded by mail to the central polling station to be counted together with the collected ballot forms electronic votes in the total election result.

Previous attempts at incorporating technology as a means of enhancing the efficiency of an election have been implemented with varied results. Electronic voting machines still require voters to report to a polling station to cast their vote and the machines themselves have been proven to be prone to reporting errors which can cast skepticism over accurate ballot results.

Even electronic voting that includes data network connectivity to cast a vote from a remote access location has been criticized due to the fact that three key vulnerabilities exist that are contrary to fundamental democratic voting elements: validation, anonymity and secure ballot tabulation.

As previously stated, elections are restricted to eligible participants, such as to ensure accurate representation and negation of fraudulent votes. Electronic transference of data and automation systems can be prone to manipulation. At present time the formal method of physical, in person identification is still the de facto method of preventing electoral fraud.

The second issue of anonymity is also a critical issue pertaining to free democratic systems. Secret ballots are essential as voters must be protected from identifiers that link them to their vote as this knowledge can be used to manipulate, threaten or coerce the individual and hinder their democratic right to vote freely without fear of intimidation.

Similarly to the problem of digital validation, electronic tabulation of ballots is vulnerable to manipulation. In 2010, India's Electronic Voting Machines, which are the most widely used method of electronic voting in the world, were proven to possess security flaws. These flaws extend to all machines that tabulate an electronic vote as a data because the data can be corrupted, often without leaving evidence of the corruption. Current methodology of counting physical ballots, while not entirely secure, is still important to transparent and auditable elections as greater effort is required to manipulate physical ballots than to alter programming code.

Canadian patent No. 2,531,618 discloses a means and method of casting an electronic vote over a data network on a digital ballot and then tabulating the final count electronically. The method's validation process includes mailing registered voters a secure key that allows them to sign into the interface and vote. It creates a digital association between the voter and the ballot that prevents over-voting by invalidating votes that have been cast twice from the same special signature. This method also relies on voter ID numbers to be communicated to voters in ways that are also vulnerable to intrusion, if a malicious agent was to obtain the voter ID numbers prior to an election, votes could be cast fraudulently and disrupt the electoral process.

The method's composition of electronic voting explains how a vote might be transferred electronically to a remote voting machine for electronic tabulation but it does not address the problem that by relying on digital tabulation, the data remains vulnerable.

In an ideal application of electronic voting, simply transmitting a voter's intent through an electronic system is simple and easy. Realistically, elections, especially ones where elected officials have the power to make laws and regulations with wide spread effect, may incentivize from interference from parties such as foreign governments, corporations, hackers, clandestine groups or criminal organizations.

The term "electronic vote" has to be construed as a vote casting instruction from a voter by means of an electronic interface via an electronic voting transmission system to be received and counted by a vote collecting authority.

For a voting system to be successful, the system should meet the requirements expected from a modern election system, for example voters residing outside of the country should be able to cast a vote. In addition, for electronic voting the technology used should be such that a significant majority of the expected potential users should be able to use the system over a regular data network connected device, without onerous installation requirements or advanced technical aptitude.

Inaccessibility and unfamiliarity with internet technologies are one of the factors that precluded electronic voting from becoming a more relevant issue pertaining to the general public. Currently, the prevalence of internet accessibility is widespread in modern societies through devices such as personal computers, laptops, smartphones, tablets or other internet enabled devices. Smartphones especially are an example of an internet enabled device with a low barrier of technical aptitude that the majority of adults now possess which can enable online voting to take place on a wider scale.

Despite the fact that the current climate of internet access is very agreeable to the implementation of technological improvements to the electoral process, the vulnerabilities outlined above still limit such implementation. One major issue pertaining to the implementation of technological improvements is the problem that as fast as systems can be designed, developed and deployed, exploitations of these same software systems are also being discovered, and thus the fundamental issue of security once again begins anew.

A simple "software" based solution to something as important to a country's processes as the election of its governing bodies falls short of what is required to provide every eligible voter a fair, transparent, accountable and anonymous election.

Electronic based voting machines at polling locations do little more than expedite tabulation at the cost of increased security vulnerabilities. Canadian Patent No. 2,531,618 discloses devices which may add accessibility through data networks, but still rely on archaic and vulnerable security measures and traditional mail delivery.

Present technological standards on internet capable devices permit the use of a myriad of technologies capable of creating a multi-faceted experience when applied to electronic voting systems. Smartphones, for example, are equipped with not only a processor but also typically include GPS, camera(s) and various radio transmitters.

An electronic voting system must do more than amend current methods with technological alternatives. It must do more than just increase efficiency, it must enhance the electoral process by providing more accessibility and/or better security while being compatible with the fundamental aspects of the democratic electoral process.

The present disclosure is directed to combining aspects of both an electronic system and traditional paper ballot method to create a widely accessible, easy to understand election voting system that takes technological permeation of the world as it exists now and how people interact with this technology in the modern societies into consideration in its implementation.

SUMMARY

In a first aspect, some embodiments of the present disclosure provide a voting system, comprising a voter interface device communicatively coupled to a data network, the voter interface device including a screen, the voter interface device configured to generate an input command containing a ballot selection; a portal server including a database containing an eligibility list, the portal server communicatively coupled to the data network and configured to connect to the voter interface device over the data network to validate an eligibility of a voter operating the voter interface device by comparing the voter to the eligibility list; a voting machine including a physical marking device and a camera, the voting machine communicatively coupled to the data network and configured to connect with the voter interface device after the eligibility of the voter has been validated to receive the input command, mark a ballot with the ballot selection using the physical marking device, capture an image of the ballot after it has been marked, send the image to be displayed on the screen for verification by the voter, hold the ballot until the voter confirms that the ballot has been properly marked, and dispense the ballot to be counted once the confirmation is received.

In some embodiments, the voting system further comprises a printer, the voting machine configured to print the ballot prior to marking the ballot.

The voting system may further comprise a holding tray for holding a plurality of unmarked ballots, the voting machine to retrieve the ballot from the holding tray prior to marking the ballot.

The voting system may further comprise a real time indicator screen within the field of view of the camera, and the voting machine is configured to receive at least one voter image from the voter interface device and display the at least one voter image on the real time indicator screen while the camera captures the at least one ballot image, the at least one voter image is an image captured by a front camera of the voter interface device.

The ballot image may be a video showing the physical marking device marking the ballot and showing the ballot after being marked.

Marking a ballot may include at least one of marking the ballot with ink, piercing the ballot, rupturing the ballot, coloring the ballot, stamping the ballot, and tearing the ballot.

The voting machine may be configured to obliterate the input command after the voter confirms that the ballot has been properly marked and the ballot is dispensed.

Connecting to the voter interface device over the data network to validate an eligibility of a voter may involve the creation of a secure connection between the voter interface device and the portal server over the data network.

Connecting with the voter interface device after the eligibility of the voter has been validated may involve the creation of an encrypted session between the voter interface device and the voting machine over the data network.

The encrypted session may be encrypted using real-time transport protocols.

The voting machine may be configured to act as a proxy server for another voting machine connecting to the voter interface device.

The data network may be the Internet.

In a second aspect, some embodiments of the present disclosure provide a voting machine, comprising a processor configured to establish a connection between the machine and a remote voter interface device to receive a ballot selection from the voter interface device; a physical marking device communicatively coupled to the processor and configured to physically mark a ballot with the ballot selection; and a camera communicatively coupled to the processor and positioned to generate at least one ballot image of the ballot marked with the ballot selection, wherein the processor is configured to send the at least one ballot image to the voter interface device, hold the ballot until a confirmation is received from the voter interface device, and dispense the ballot for counting.

In some embodiments, the voting machine further comprises a printer, the processor configured to direct the printer to print a ballot to be marked by the physical marking device.

The voting machine may further comprise a holding tray for holding a plurality of unmarked ballots, the physical marking device configured to retrieve an unmarked ballot of the plurality of unmarked ballots to be marked with the ballot selection.

The at least one ballot image may be a video showing the physical marking device marking the ballot and showing the ballot after being marked.

The voting machine may further comprise a real lime indicator screen within the field of view of the camera, and the processor is configured to receive at least one voter image from the voter interface device and display the at least one voter image on the real time indicator screen while the camera captures the at least one ballot image.

In a third aspect, some embodiments of the present disclosure provide a voting method, comprising connecting to a voter interface device over a data network; validating an eligibility of a voter operating the voter interface device by comparing the voter to an eligibility list stored on a database;

connecting the voter interface device to a voting machine after validating the eligibility of the voter; receiving a ballot selection from the voter interface device; marking a ballot with the ballot selection using a physical marking device of the voting machine; capturing an image of the ballot after it has been marked; sending the image to be displayed on a screen of the voter interface device; holding the ballot until the voter confirms that the ballot has been properly marked, and dispensing the ballot to be counted once the confirmation is received.

In some embodiments, the method further comprises printing, using a printer of the voting machine, the ballot prior to marking the ballot.

The ballot image may be a video showing the physical marking device marking the ballot and showing the ballot after being marked.

BRIEF DESCRIPTION OF THE DRAWINGS

The drawings included herewith are for illustrating various examples of systems, methods, and apparatus of the present specification. In the drawings.

DETAILED DESCRIPTION

The present disclosure is directed at providing an improved electronic voting system. Embodiments of the present disclosure may allow remote users to electronically communicate their votes to a machine which physically marks a ballot and may allow tabulation of said ballot by a vote collecting authority.

In some embodiments, a voting system or method will be executed with a trade-off between requirements that can be met by proper design and implementation of the hybrid model electronic voting system, and requirements which can be met through organizational measures. In some embodiments, certain requirements are met by administration measures taken by electoral regulatory bodies presiding over the application of embodiments of the present disclosure.

The following criteria should at least be met, either by the voting system itself, or by a combination of organizational requirements and administrative regulations.
only eligible persons can vote;
no person can vote more than once;
the vote is anonymous and secret;
each valid vote is counted; and
the voters can trust that their vote is cast and counted correctly.

A hybrid model electronic voting system and/or method for enabling individual voters to remotely cast a ballot electronically via inputs to a receiver where a user controls a mechanical system that produces a physical, readable ballot, may comprise one or more of:
means for producing a physical unmarked ballot;
means to randomize and encrypt the electable subject list on a ballot;
means for producing an election reference record of all ballots to be used in an election and registered voters eligible to vote;
means of registering voters eligible to vote in an election;
means of storing and retrieving an election referencing record database comprised of eligible voters;
means of communicating said database comprised of eligible voters registrations to the electronic voting system;
means of creating an interface application that allows a voter to take part in the secure voting online session;
means to load said interface application onto a voters device;
means for visually authenticating an eligible voter for validation in said election;
means for generating a secure session environment for communicating between voter and vote casting mechanism;
means for vote casting mechanism to operate securely and validate that the process is operating in a secure and protected system;
means for generating a unique ballot subject identifier code for each electable subject on said ballot;
means for anonymizing data connection between voter and ballot casting mechanism;
means for authenticating ballot casting mechanism to said voter;
means for securing data connection between interface input controls and ballot casting mechanism;
means for ballot casting mechanism to respond to input from voter and mark corresponding ballot in an identifiable and human readable format;
means for voter to confirm that said ballot has been properly marked with correct voter intention;
means for voter post-ballot confirmation to validate voter participation in said election and prevent dual voting from being registered in said election;
means for confirmation of marked ballot and voter participation to be communicated to said voter;
means for collecting and tabulation of cast ballots; and
means for allowing transparent auditing of electronic voting system by an election authority or authorized third party.

Registering and maintain a database necessary to corroborate eligible voters is typically organized by a government or election authority. Some embodiments of the present disclosure allow for optimization of such a database. In some embodiments of the present disclosure there is provided a system or method to register voters through submission of acceptable identification documents directly through a user interface. The user interface may be provided by or on a computer or smartphone, such as a device which includes one or more cameras.

Those familiar with electoral regulations understand that the practice of many voting methods is bound by governmental legislation and regulations from a voting authority. Embodiments of the present disclosure allow for improved efficiency of authentication by creating a database of eligible voters as described herein, however some embodiments implement verification methods mandated by a voting authority as a means of registering and validating eligible voters. Where the voting authority requires certain methods, those requirements may supersede the methods that would otherwise be employed.

Despite the aforementioned stipulation, in some embodiments a method of registering and creating a database of eligible voters comprises accepting the necessary identification, including photo identification, from a voter. This registration may allow voters to participate if they satisfy the first aforementioned criteria and can be validated upon participation of the election by means of visual authentication and regulated voter identification requirements. In some embodiments, a voting system visually authenticates voters by a recognition algorithm, human authentication or a combination of both.

In some embodiments, a voting system can create a physical ballot using a subject list to be included on a ballot as provided by an election authority. In some embodiments, the visual arrangement or other representation of the subject list on a ballot is also directed by the election authority. In some embodiments, a voting system is configured to create a set of ballots for use in an election using an image editing computer program.

In some embodiments, a voting system uses ballots created for the electronic voting method by an election authority and loaded into a voting machine, rather than creating ballots. However, printing or otherwise creating the ballots using a controlled computer program may allow for the inclusion of an additional security measure, such as encrypting an optical element that connects the ballot to the ballot casting mechanism or randomizing the subject list using symmetric encryption. In some embodiments, a key created during the production of specialized ballots is loaded into a central processing unit that controls the ballot casting mechanism to provide an additional layer of security. It will be appreciated by those skilled in the art, that this method of producing physical ballots may be authorized only by the regulations set by an election authority. Printing ballots also allows the system to create additional ballots under the same aforementioned security protocols, such as allowing for an unlimited number of ballots to be generated in the case of discarded, uncompleted ballots or additional registration of eligible voters not previously included in the election authorities database.

It is understood by those familiar with election regulations and authorities that ballot creation may fall under the organizational measure, which requires optimization from an election authority to satisfy the necessary regulations pertaining to the practice of the hybrid model electronic voting system in an election.

It will be appreciated by those skilled in the art, with regards to voter identification, this is typically regulated by the specific voting authority of said election. Some embodiments of a voting system allow for optimization between these regulated requirements and the database required to validate said voters eligibility in said election. If the regulators of an election administer a voter ID number to be assigned to a voter for database management, some embodiments of a voting system allow for such an identifier to be created in the election reference record, but such a number may not be needed for anything other than to corroborate eligibility in an election or reference voter participation to an election authority. Visual authentication may be used for validation, but, due to regulatory expectations, some embodiments allow for input of necessary election authority regulations over voter identification requirements such as name, government issued ID, social insurance/social security number to coincide with visual authentication as a means to satisfy regulated identification requirements and validate voter eligibility.

To authenticate voter eligibility in an election, a database may be created based on an election authority's necessary requirements for voter registration. This database is to be loaded into a server that validates voter eligibility. In some embodiments, visual authentication of voters uses election authority-accepted IDs as listed by the election authority and voter-submitted photographic images that can be tested against the database either by but not restricted to a recognition algorithm or human visual authentication.

In some embodiments, the term vote casting mechanism is to be construed as a machine that physically marks a ballot by means of remote input from a voter, hereafter further referred to as a voting machine. In some embodiments, the vote casting mechanism also is the end point IP address of the end-to-end secure session created when a voter logs into an interface.

In some embodiments, to satisfy the second aforementioned criteria, the secure session is a one-time use link between the voter and the voting machine over a data network for use not only in establishing an encrypted link between voter and voting machine but also for session validation to avoid double voting. The secure session may be closed by means of confirmation from the voter that their ballot has been successfully cast. Due to the possibility of dropped signals, packet loss, packet duplication or interference, a session and the confirmed ballot may be discarded if final confirmation is not received and may not be included in final tabulation. This session confirmation may designate whether a voter has participated in the election by casting a valid ballot, and if the conformation is not received by the session indicator, a second attempt at casting a ballot may be permitted.

This confirmation of a valid ballot marker may reflect the current understanding that a ballot is only valid if handed to a vote collecting authority and subsequently marked using the correct identifiers mandated by the regulations pertaining to the specific election.

In some embodiments, to satisfy the third aforementioned criteria, a voting system or method makes use of anonymizing technology to mask the connection between the voter and the marked ballot. Established network protocols such as TOR relays or proxy servers, for example, are capable of creating such an anonymous link over open data connections such as the internet. In some embodiments, a voting system is configured to mask the destination IP, MAC or any other identifiers from not only outside signal observers but also from the electronic voting system itself. The data records of the action between interface and voting machine may also self-obliterating to ensure secrecy when casting a ballot. In some embodiments, a voting system allows for an element of the protocol used in securing the remote voting action to be used to allow the voter to confirm that their vote has been registered, post-confirmation, accurately. In some embodiments, this single connection drawn between voter and vote is used to help satisfy the fourth aforementioned criteria of a voters trust in their said vote and will be known only to the election reference records to register that a vote had taken place and to the voter if they so choose to validate through said means and only if applicable under election authority regulations.

The fourth aforementioned criteria denotes that a voter must have trust that their vote has been cast correctly and also that their ballot is tabulated in the final vote count. In accordance with the aforementioned criteria, in some embodiments a method of electronic voting establishes this trust by utilizing the full potential of modern data network-enabled devices to extend the voter's sensory appreciation across a data network so that the voter may confidently allow a mechanical device to mark the intended ballot accurately.

In some embodiments, participation in an election begins with a voter activating an application on a data network-enabled device. In some embodiments this application will be further referred to as the "interface", which enables interactivity between the voter and voting machine. As will be appreciated by those skilled in the art, a communication enabled application activated on an operating system may require a destination IP, this destination IP will be referred to as the "reference server". The reference server may be where the validation of eligibility takes place by way of user inputs but also the aforementioned visual authentication. As modern communication enabled devices are comprised of various additional features beyond the standard features of a standard computer, a voting system or method may utilize these additional features such as but not limited to; the front facing camera hereafter referred to as "front camera", the back facing camera hereafter referred to as "back camera", GPS receivers, location enabling protocols, microphone, speaker, haptic touch interface, vibration motors and haptic or tangible keyboards.

In some embodiments utilizing these features, the reference server establishes a secure channel to the communication device's front camera and compares the inputs and visual validation algorithm to the election reference records and visual authentication system. As will be appreciated by those skilled in the art, formal election participation may require both visual and electoral regulated databases to ensure that the registered voter is in fact eligible to participate in the election. In some embodiments, these traditional methods are reflected by way of a recognition algorithm that matches a voters picture identity located on the election reference record against the cameras real-time visual field. This recognition matching algorithm can be either replaced or used in conjunction with human observers to validate voter eligibility visually.

In some embodiments, after validation has occurred a unique secure session channel is created between the interface and the voting machine. This unique channel is strengthened by an encryption protocol, such as ZRTP which is a real-time transport protocol enabling secure visual communication between the voter interface and the voting machine. In some embodiments, a voting machine acts as a relay server which encrypts the destination IP and other identifiable information from the reference server and outside observers. In some embodiments, while the destination IP of the designated voting machine for the designated voter is established in the initialization of unique secure session channel, this encrypted information is known only to the machine and the voter interface and only for as long as the session is open until confirmation of the ballot being completed denotes the termination of the unique secure session channel. These embodiments are advantageous as they improve secrecy from observers but also creates a strong defense against malicious interference as the layers of encryption and unknown destination IP make it hard to ascertain a direct link between voters in a particular geographic location to a preconfigured destination IP address. Even if a malicious attempt was somehow successful in fraudulently altering a single vote, subsequent attempts would be equally as difficult to accomplish which appeals to the conventional wisdom that poll based voting is secure due to the high-risk, low-reward involved in voter fraud.

In some embodiments, a voting machine can incorporate multiple different machines that are mechanically identical to each other. In some embodiments, these machines are comprised of 4 main technical properties: the computer, a processing unit with the standard CPU and memory aspects that houses the election reference record ballot database and allows for electronic control over the mechanisms comprising the rest of the machine; the camera which is in a fixed position to incorporate the view on the ballot for visual appreciation of the voter; the server system which acts as the IP relay for the anonymizing network and destination IP for the unique secure session channel; and the ballot holder and marking mechanism which is used to load unmarked ballots, identify them with a visual indicator and subsequently disperse them from the machine to the holding area to await confirmation of validity.

In some embodiments, these components comprising the voting machine are housed together or connected together from separate housing units but the system and function thereof constitutes the voting machine as a whole.

In some embodiments, the computer system further referred to as the "computer" is a standard processing unit affixed to a circuit with memory and relevant input/output controls to the mechanisms. In some embodiments, the other mechanisms may also contain processing units that may perform checksum n-version programming functions against the central operating system but the computer is the central device authorizing the controls of the components said voting machine. In some embodiments, the server is a standard server program and device performing computational client-server models in addition to its role as relay and destination IP for the unique secure session channel. Additionally, in some embodiments, the camera mechanism of the voting machine is oriented to image a screen displaying a connection to the front camera of the voter interface, allowing for the voter to visually witness themselves inside the machine alongside the ballot in a further verification of authenticity of vote security. It will be appreciated that the mechanism housing the ballot unit, vote casting mechanism and dispensing mechanism it to be considered a whole unit in some embodiments, controlled by the computer and configured to dispense a ballot into a separate holding area before the ballot would finally exit the voting machine for tabulation.

In some embodiments, the aforementioned system comprises the voting machine for use in the hybrid model electronic voting system as a receiver to mechanically mark a physical ballot from input commands from a remote interface. In some embodiments, the a voting system provides a secure operating channel between the interface and the vote casting machine, which allows for authenticated physical voting from anywhere a data connection between the voter's device and the voting machine receiver can be established.

In some embodiments, the voting machine receives input commands via the unique secure session channel from the interface by such means but not limited to haptic touch, voice instructions, or manual control functions used to provide instruction to a voter device. Upon establishment of the unique secure session channel from the reference server, the voter will visually see the ballot by means of the voter device's screen. In some embodiments, as an extra authentication measure, an additional screen will be connected to the front camera of the voter device to display the voter's live stream in the machine, alongside the ballot to visually affirm that the connection is secure and the voter is in fact marking an official ballot.

In some embodiments, the computer creates a connection between the ballot and the input controls by means of optical codes, read by the camera mechanism and transferred via the unique secure session channel to the interface's input controls. These optical codes, such as QR codes, barcodes or data matrix, can incorporate data of the ballot selection for the voter and correspond to the voters input commands to the ballot casting mechanism to cast a vote. As an extra measure to strengthen security, these optical codes can be encrypted to provide both secure data and input control transmission through the unique secure session channel.

Accordingly, in some embodiments, the hybrid model electronic voting system's use of real-time secure channel visualization lowers vulnerabilities related to packet loss or latency issues because the only data packet that requires transference over the data network is the vote itself and any double reception of data would be counted towards and given the same priority so long as the destination mechanism was the same.

Additionally, some embodiments of the present disclosure provide the means for receiving input controls from the interface to control a mechanism that physically marks a ballot as intended by the voter. The mechanism is situated in the voting machine in such a way that the view of the ballot through the camera does not obstruct the ability for the voter to see the ballot in its entirety. In some embodiments, the vote casting mechanism is placed above the ballot and uses a physical identifier such as but not restricted to ink, piercing, rupture, coloration, stamping or tear as a means to physically identify that a ballot has been marked. In some embodiments, this mechanism be an automated device controlled by the computer via input controls from the interface by the voter.

In addition, as an extra security measure, some embodiments provide the means for the generation of a unique code to visually authenticate the unique secure session channel. The generation of the unique code is visually authenticated to the voter through the interface and then exchanged upon the establishment of the unique secure session channel creation with the voting machine through a key exchange. In some embodiments, this corresponding unique code is authenticated on the ballot by means such as but not limited to visual display, audio transmission or by real time marking on the ballot. This unique key may provide two separate functions:

Visual authentication of secure channel validity to the voter which ensures protection from man-in-the-middle type intrusion attacks. If the unique code does not match the displayed authentication key a reasonable assumption should be made that an attack is indicated and the session can be discarded.

The key is used as a secure and anonymous voter identification method to transmit cast ballot authentication to voter. A voting system or method may provide means for this code to correspond to the marked ballot by means of a visual identifier, transmitted to the voter, which can then be loaded into the final tabulation database for use by the voter to authenticate that their vote was correctly counted.

In some embodiments, upon completion of marking the ballot a camera takes a picture of the completed ballot and stores the image in the computer's memory until confirmation has been received as a final input from the unique secure session channel. After completion has been authenticated, the image is encoded with a termination code and transmitted to the voter's interface as final validation that the vote has been successfully cast.

In some embodiments, the ballot is loaded into the vote casting tray in view of the camera by means of an automated feed, controlled via the computer. Once marked, the marked ballot is dispensed out of the machine and into a holding tray for tabulation.

Once final validation from the voter's interface has been received, the unique secure session channel may be terminated and data from the operating memory of the computer pertaining to the actions committed by the user via input controls from the interface may be deleted.

In some embodiments, once final validation of participation of a voter in an election has been received, the voter's interface may transmit the voter's completion of participation in an election to the election reference record via the reference server and the ability for the interface to create a unique secure session channel may be terminated in order to avoid double voting.

In some embodiments, tabulation of the physically marked ballots takes place using a visual electronic counting system such as but not limited to optical mark counting or human tabulation. Human tabulation of marked ballots may be performed not unlike the traditional method of counting the marked ballot subject and tabulating the results and transmitting them to a central voting authority.

In some embodiments, a report log and code depository of the operation of a voting system is created upon completion of said election to allow an election authority or authorized third party to verify accurate system operation. This accountability may be possible due to the fact that the payload of the system is a physical ballot rather than a piece of data that needs to be secured. The method and system is open to audit due to the fact that the transmission of data is secured and not the result of said transmission. The security of a physical ballot trail remains intact, and the result reflects traditional methodology and current understanding of optimum operations of a democratic election system.

Some embodiments of the present disclosure may be implemented as a computer program product, comprising program code means stored on a computer readable medium, for performing the or part of the steps according to the disclosure as disclosed above, if loaded into an internal working memory of a computer and operated by the computer. In some embodiments, the computer program product may be arranged as a tool for generating ballots for use in the voting machine, as a tool for creating an election reference database for use in validating eligible electors, as a tool for loading onto a computer running computer controlled voting machine or as a tool for creating the interface for use with a voters' preferred data communication enabled device performing the steps of the disclosure as disclosed above.

Figure 1:
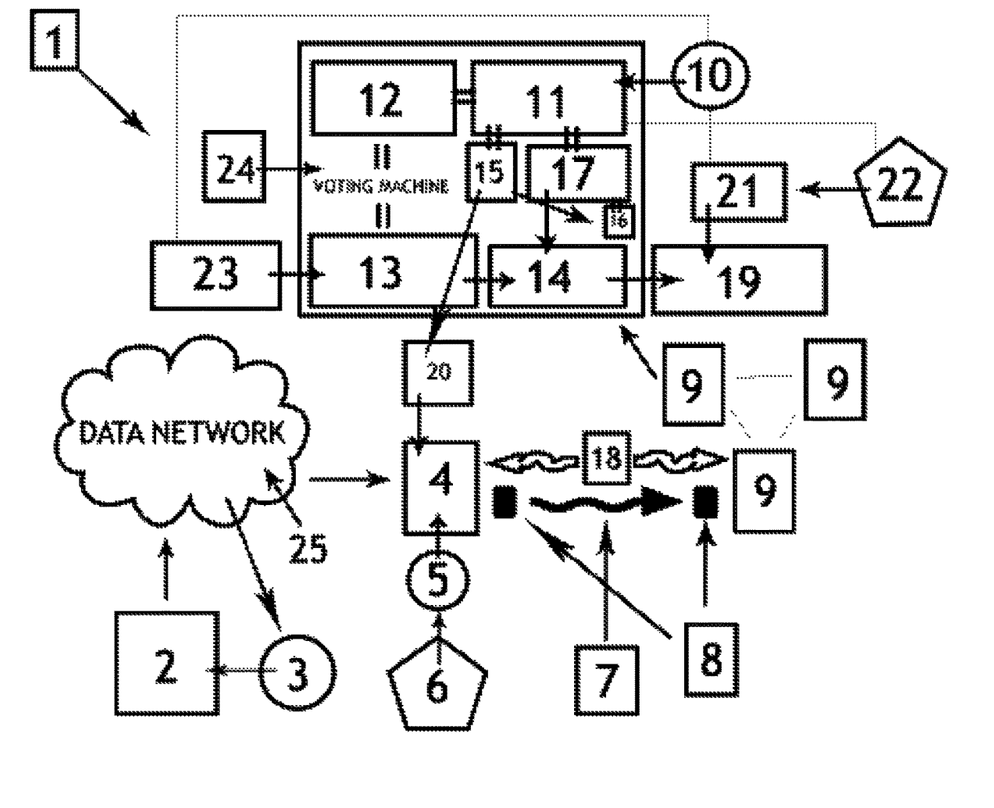
FIG. 1 is a schematic view of a voting system, according to an embodiment.

FIG. 1 is a schematic drawing of an example of a hybrid model electronic voting system as a whole.

With reference to the drawing, reference numeral 1 indicates, as a whole, in a general and schematic manner, an example of a hybrid model electronic voting system that allows a voter to cast a vote, through a data network such as the internet, over a secure connection, to a machine that physically marks a ballot for counting.

Reference numeral 2 designates the user interface. The user interface is a software that allows for data transmission over a data network, such as the internet, to be used in conjunction with the capabilities of the hardware the software is loaded on, as the input control to the physical voting machine as indicated by reference numeral 24.

Reference numeral 3 designates the means for generating the software interface as indicated in reference numeral 2. As each device the interface may be loaded onto can vary in terms of operating system, the means for generating the necessary utility to function per across a range of devices may vary in terms of programming requirements, but the expected function of creating an interactive, responsive interface that can visually verify the ballot to the voter operating the input controls through the interface can be appreciated by those familiar in the art.

Data Network as indicated by reference numeral 25, refers to a public network that allows the transmission of data, such as the internet. This data network can be accessed by reference numeral 2's interface, loaded onto a data transmission enabled device such as but not limited to, a smartphone or computer. These devices can connect to the data network by means not limited to GSM network, CDMA network, LTE network, Wi-Fi routers, and broadband or fiber optical connections. The software generated by reference numeral 3 can also be transmitted through said data network as the means to load the software onto the voter's device.

Reference numeral 4 indicates the initial destination IP for the interface software to connect to. This destination IP is a server used to validate the identity of each individual voter and validate their eligibility according to the requirements of the voting authority, as indicated by reference numeral 6. Reference numeral 5 represents the means for generating the eligibility list by either a database provided by the voting authority, which is represented by reference numeral 6, or by its own internal database compiled by inputs through the interface software such as but not limited to, user data input fields, visual confirmation, recognition algorithm, biometrics, secure identification number or audio recognition.

The server as designated by reference numeral 4 also acts as a portal where a secure connection can be established post validation. The security from interface to reference server uses standard symmetric encryption such as but not restricted to AES, as well as but not restricted to, RSA certificates and SSL to establish a secure connection between interface and reference server.

After the voter's eligibility has been validated, a secondary level of encryption takes place while the session is transferred to the voting machine systems as indicated by the reference numerals 9. This channel is designated by reference numeral 7, and uses Real-Time Transport Protocols, such as but not restricted to ZRTP, to encrypt the session between interface and voting machine systems.

The reference numerals labeled 9 indicate a plurality of machines necessary for the election. As will be appreciated by those familiar to the art, different ballot requirements are typically required for different variables in an election such as but not limited to districts, candidates or levels of government up for election. Each machine houses a particular set of ballots, as denoted by an election authority and each machine also houses a server that acts both as a destination IP for the secure channel indicated by reference numeral 7, and also as a relay for the channel itself.

As will be appreciated by those familiar in the art, data transported over a network is typically contained in packets with a header used for routing through the network. The illustrated voting machines may act as relays, each machine as a proxy server combined with additional encryption such as but not limited to root certificate authorization or rendez-vous protocols, where the destination and data is obfuscated from eavesdropping by making the destination IP difficult to ascertain in the time that the session is open. In the illustrated embodiment, this means that if there was an unauthorized second party to the session, they would have a very limited amount of time to figure out which machine housed the particular ballot they intended to tamper with. Additionally, the anonymity provided by the proxy server means that linking the voter to the ballot becomes difficult and protects the integrity of the secret vote.

In addition to the protected channel as designated by reference numeral 7, a further security measure is initialized at the beginning of the session between interface and voting machine. In order to ensure and authenticate to the voter that the session is in fact free from unauthorized parties, a secure identifier is displayed to the voter on the screen of the interface as designated by reference numeral 8. This secure identifier is a cryptographic hash value such as but not restricted to a short authentication string, which displays a value or secure identifier to the voter. The same value is then displayed inside the voting machine at the destination IP to allow the voter to authenticate the security of the ballot and cast a secure vote. This security measure restricts intrusion attempts to correctly guess the secure value in one attempt, if the values at both sides do not correspond, an attack is indicated and the session will be terminated, allowing the voter to try again in another session.

Reference numeral 24 designates a single voting machine and the various components it comprises.

Reference numeral 11 is the operational computer for the machine comprising the typical associated components such as but not restricted to, processor, memory, input/output controls for the other voting machine attachments. Reference numeral 10 designates the means for generating the operational software necessary to run the machine and also the means for loading the cryptographic keys which secure the connections between servers and the hash values for cryptographic keys associated with the randomization of the ballots. These values are loaded into two active memories, the computer and the printer as indicated by reference numeral 23. The printer is the means to physically generate the ballots by printing them according to the keys generated by the means as indicated by reference numeral 10. The printer is physically separated from the voting machine to ensure incorruptibility at inception of ballot creation. The keys generated are manually loaded into the voting machine at the time of an election to prevent attacks from gaining access to the randomization block cypher used to generate the values and corresponding keys. Each time a number of ballots is printed, a corresponding key value is generated per ballot that is used by the computer to associate the input control from the interface to the correct value of the ballot selection. This measure ensures that an automated attack that automatically associates an input to a selection is not possible as the selections themselves are randomized and require direct input controls on a per ballot basis for correctly casting a voter's intention to the machine.

Reference numeral 12 is the server which establishes the connection between the machine and the interface. It also acts as the aforementioned relay proxy server to mask the IP and packet data. The server has no manual configuration interface and is only operated by the computer as indicated by reference numeral 11. This ensures that the security is contained to the location of the machine as a whole rather than a offsite location with various vulnerabilities. Upon the establishment of a connection between the server and the interface, a ballot is loaded from the holding tray as indicated by reference numeral 13, into the casting tray as indicated by reference numeral 14.

Reference numeral 15 is a camera, fixed on the ballot tray. This camera is the final destination of the secure channel created between the interface and the voting machine server. The session created by, but not restricted to, the real time protocol transmits the view of this camera to the voter interface device. The voter will see the ballot and the selections of the election on the screen in real time. This secure channel will be further secured by the aforementioned secure identifier as indicated by reference numeral 8. In some embodiments, an additional real time secure indicator will be displayed alongside the ballot, within view of the camera but not obstructing the selections on the ballot in any way as designated by reference numeral 16. This real time indicator will provide additional trust to the voter that this ballot vote is happening in real time and that this particular ballot is being marked by said voter. The real time indicator, can be but not limited to, a screen connected to the front camera that shows the voters face, a display screen of the voters identity to confirm ownership of the vote or a display confirming real time data to the voter that indicates that this vote and ballot is authentic and happening in conjunction to the voter casting their vote.

To further protect the security and integrity of the election. The camera will also transmit data to the computer from the ballot by means of optical codes assigning each selection to a desired input control. The optical codes are created and correspond to the cryptographic value designated by means produced by reference numeral 10, and loaded into the operating system at the time of the election.

At the time of the actual voting to begin, the interface of the illustrated example highlights the selections available on the ballot by means of, but not limited to, visual indicators, audio indicators, haptic indicators or a combination of. These input controls are transmitted through the session channel by means of an encrypted input control channel as indicated by reference numeral 18. This separate layer of encryption happens at the time the voter inputs the command to mark a selection. A typical input control first arrives at a hardware controller on the devices motherboard which the interface is loaded on, which forwards them to the operating system kernel's input stack. They are then processed by the operating system's input manager, which sends them to a queue belonging to the application window that currently has input focus. The application then retrieves the input from the queue and interprets it in context and displays the result to the user. In the illustrated embodiment, this input path is first diverted to a scrambler algorithm which obfuscates the input from the operating system kernel. This process takes the data and hides it from the devices own input manager as a random value. This value is then transmitted over the network through the secure channel as indicated by reference numeral 7 and deciphered by the voting machine as indicated by reference numeral 11. This action is initiated by, but not limited to, a three step verification check where the interface prompts the voter three times to confirm their selection and transmits the actual input control on the final attempt. This input function corresponds to a physical marking device as indicated by reference numeral 17 which reads the deciphered input control and marks the corresponding selection as per the computers encrypted selection value. This mechanical process is visually authenticated by the voter by means not limited to ink, piercing, rupture, coloration, stamping or tear, and allows the voter to authenticate that the ballot was marked correctly according to their intended input function as the voter validates the result of their input command.

The scrambling algorithm and input function are both self-obliterating operations, meaning, the data of the function in the allocated memory is wiped from both the voter device and operating system by way of erasure and self-replicating code intended to delete and mask the confirmed action from surveillance. This function operates similarly to a one-time-pad cryptographic cypher in which both the keys and plaintext are to be destroyed post decryption. This function ensures the integrity of the secret vote by leaving no confirmation of the voter's intended selection after the ballot has officially been marked. This signal to delete the data from the device is transmitted after the confirmation of post ballot marking as indicated by reference numeral 20.

After a ballot has been marked, the ballot is dispensed into a holding tray as indicated by reference numeral 19. In this area the ballots can be collected and tabulated by either electronic or human means. An electronic voting tabulator would visibly scan the document and associate its physical markings to the associated algorithm as designated by means from reference numeral 10. Alternately or in conjunction, an election authority could oversee the tabulation of marked ballots and register the final count results to the electorate as indicated by reference numeral 21.

In some embodiments, the camera would send a snapshot of the completed ballot along with the secure indicator to the voter's device by means of reference numeral 20. This snapshot would also be a self-obliterating operation but would allow the voter the opportunity to use the secure indicator as a means to see that their vote has been correctly cast by publically displaying the keychain of secure indicators to the cast vote over but not restricted to, a data network such as the internet, TV, radio or in print. After confirmation the image would terminate itself by but not restricted to erasure and self-replicating code.

Upon completion of the ballot, the secure channel indicated by reference numeral 7 will send the voter back to the reference server indicated by reference numeral 20. Here the voter will be prompted to close the session by confirming if his vote was cast correctly. Upon successful completion a signal will be sent to the voting machine to dispense the ballot to the correct holding tray and erase the IP from its memory. This may be included in some systems or methods secure the anonymity of the vote from any intrusion attempt including internal corruption.

Completion of a ballot confirmation also bars the user from accessing the reference server again. This prevents the same user from over-voting and multiple ballots cast from the same individual voter. In addition, the voter's participation will be registered to the reference server's database.

To ensure transparency in an election some embodiments allow an election authority or authorized third party to audit the system of said electronic voting system by means of checksum operation result log and code base depository. Because the payload of the voting system is the physical ballot, the illustrated example system offers full transparency and auditability by an election authority or authorized third party, as indicated by reference numeral 22, to ensure that no malicious operation has taken place during the method outlined above.

While the above description describes features of example embodiments, it will be appreciated that modifications and additions can be made within the scope of described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A voting system, comprising:
   a voter interface device communicatively coupled to a data network, the voter interface device including a screen, the voter interface device configured to generate an input command containing a ballot selection;
   a portal server including a database containing an eligibility list, the portal server communicatively coupled to the data network and configured to connect to the voter interface device over the data network to validate an eligibility of a voter operating the voter interface device by comparing the voter to the eligibility list;
   a voting machine including a physical marking device and a camera, the voting machine being remote from the voter interface device and communicatively coupled to the data network and configured to:
connect with the voter interface device after the eligibility of the voter has been validated to receive the input command,
mark, after receiving the input command and while the voter interface device is not at the voting machine, a ballot with the ballot selection using the physical marking device,
capture, after marking the ballot using the physical marking device, an image of the marked ballot,
send the image of the marked ballot to be displayed on the screen for verification by the voter,
hold the ballot until the voter verifies that the ballot has been properly marked, and
dispense, once the verification is received, the ballot to be counted.

2. The voting system of claim 1, further comprising a printer, the voting machine configured to print the ballot prior to marking the ballot.

3. The voting system of claim 1, further comprising a holding tray for holding a plurality of unmarked ballots, the voting machine to retrieve the ballot from the holding tray prior to marking the ballot.

4. The voting system of claim 1, further comprising a real time indicator screen within the field of view of the camera, and the voting machine is configured to receive at least one voter image from the voter interface device and display the at least one voter image on the real time indicator screen while the camera captures the at least one image, the at least one voter image is an image captured by a front camera of the voter interface device.

5. The voting system of claim 1, wherein the image is a video showing the physical marking device marking the ballot and showing the ballot after being marked.

6. The voting system of claim 1, wherein marking a ballot includes at least one of marking the ballot with ink, piercing the ballot, rupturing the ballot, coloring the ballot, stamping the ballot, and tearing the ballot.

7. The voting system of claim 1, wherein the voting machine is configured to obliterate the input command after the voter confirms that the ballot has been properly marked and the ballot is dispensed.

8. The voting system of claim 1, wherein connecting to the voter interface device over the data network to validate an eligibility of a voter involves the creation of a secure connection between the voter interface device and the portal server over the data network.

9. The voting system of claim 1, wherein connecting with the voter interface device after the eligibility of the voter has been validated involves the creation of an encrypted session between the voter interface device and the voting machine over the data network.

10. The voting system of claim 9, wherein the encrypted session is encrypted using real-time transport protocols.

11. The voting system of claim 1, wherein the voting machine is configured to act as a proxy server for another voting machine connecting to the voter interface device.

12. The voting system of claim 1, wherein the data network is the Internet.

13. A voting machine, comprising:
a processor configured to establish a connection between the machine and a remote voter interface device to receive a ballot selection from the voter interface device;
a physical marking device communicatively coupled to the processor and configured to physically mark a ballot with the ballot selection while the voter interface device is not at the physical marking device; and
a camera communicatively coupled to the processor and positioned to generate at least one ballot image of the ballot after the ballot is marked with the ballot selection by the physical marking device,
wherein the processor is configured to:
send the at least one ballot image to the voter interface device while the voter interface device is not at the physical marking device,
hold, after sending the at least one ballot image to the voter interface device, the ballot until a confirmation is received from the voter interface device, and
dispense, after the confirmation is received from the voter interface device, the ballot for counting.

14. The voting machine of claim 13, further comprising a printer, the processor configured to direct the printer to print a ballot to be marked by the physical marking device.

15. The voting machine of claim 13, further comprising a holding tray for holding a plurality of unmarked ballots, the physical marking device configured to retrieve an unmarked ballot of the plurality of unmarked ballots to be marked with the ballot selection.

16. The voting machine of claim 13, wherein the at least one ballot image is a video showing the physical marking device marking the ballot and showing the ballot after being marked.

17. The voting machine of claim 13, further comprising a real lime indicator screen within the field of view of the camera, and the processor is configured to receive at least one voter image from the voter interface device and display the at least one voter image on the real time indicator screen while the camera captures the at least one ballot image.

18. A voting method, comprising:
connecting to a voter interface device over a data network;
validating an eligibility of a voter operating the voter interface device by comparing the voter to an eligibility list stored on a database;
connecting the voter interface device to a remote voting machine after validating the eligibility of the voter;
receiving a ballot selection from the voter interface device;
marking a ballot with the ballot selection using a physical marking device of the voting machine, wherein the voter interface device is not at the voting machine when the physical marking device of the voting machine marks the ballot;
capturing an image of the ballot after it has been marked,
sending the image to be displayed on a screen of the voter interface device;
holding the ballot until the voter confirms that the ballot has been properly marked; and
dispensing the ballot to be counted once the confirmation is received.

19. The method of claim 18, further comprising printing, using a printer of the voting machine, the ballot prior to marking the ballot.

20. The method of claim 18, wherein the ballot image is a video showing the physical marking device marking the ballot and showing the ballot after being marked.

* * * * *